3,259,631
5,11 - DIHYDRODIBENZ AND 5,11 - PYRIDOBENZ-
[b,e] [1,4]OXAZEPINE-5-CARBOXYLIC ACID AM-
IDES AND DERIVATIVES
Harry Louis Yale, New Brunswick, Francis Alexander
Sowinski, Edison, and Jack Bernstein, New Brunswick,
N.J., assignors, by mesne assignments, to E. R. Squibb
& Sons, Inc., New York, N.Y., a corporation of Delaware
No Drawing. Filed Jan. 29, 1963, Ser. No. 254,597
5 Claims. (Cl. 260—295)

This invention relates to new chemical compounds having valuable therapeutic properties, processes for the preparation thereof, and new intermediates useful in such processes.

The therapeutically active compounds of this invention include compounds of the general Formula I:

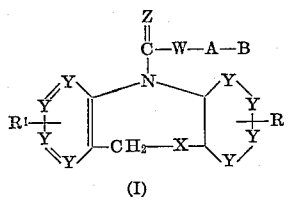

(I)

and non-toxic salts thereof, such as non-toxic acid addition salts and non-toxic quaternary ammonium salts, wherein one Y is aza (—N=) or methylidene (—CH=), the remaining Y's are methylidene, X is oxy (—O—) or thio (—S—), Z is oxo (O=) or thia (S=), W is oxy or imino (—NH—), A is a lower alkylene radical of at least two carbon atoms, B is a basic saturated nitrogen-containing radical of less than twelve carbon atoms, and R and R' are the same or different and represent hydrogen, halogen, lower alkyl, lower alkoxy, trifluoromethyl, trifluoromethylmercapto, trifluoromethoxy or N,N-dimethylaminosulfonyl. Among the suitable radicals represented by the symbol B are: amino; (lower alkyl)amino; di(lower alkyl)amino; (hydroxy-lower alkyl)amino; di(hydroxy-lower alkyl)amino; and basic saturated 5 to 7 membered N-heterocyclic radicals of less than twelve carbon atoms, as exemplified by piperidyl [i.e., piperidino, 2-piperidyl, 3-piperidyl and 4-piperidyl]; (lower alkyl)piperidyl [e.g., 2,3, or 4-(lower alkyl) piperidino or 2,3, or 4-(N-lower alkyl)piperidyl]; di(lower alkyl)piperidyl [e.g., 2,4- 2,5- or 3,5-di(lower alkyl)-piperidino, or 2,3, or 4-(N-lower alkyl-2,3, or 4-(lower alkyl)piperidyl]; (lower alkoxy) piperidyl; pyrrolidyl; (lower alkyl)pyrrolidyl; di(lower alkyl)pyrrolidyl; (lower alkoxy)pyrrolidyl; morpholinyl [i.e., morpholino, 2-morpholinyl and 3-morpholinyl]; (lower alkyl)morpholinyl; di(lower alkyl)morpholinyl; (lower alkoxy)-morpholinyl, thiamorpholinyl; (lower alkyl) thiamorpholinyl; di(lower alkyl)thiamorpholinyl; (lower alkoxy)thiamorpholinyl; piperazyl; (lower alkyl) piperazyl (e.g., N⁴-methylpiperazino; di(lower alkyl) piperazyl; (lower alkoxy)piperazyl; (higher alkanoyloxy-alkyl)piperazyl [e.g., N⁴-(2-heptanoylethyl)piperazino]; (carbo-lower alkoxy)piperazyl [e.g., N⁴-(2-carbomethoxy, carboethoxy, or carbopropoxy)-piperazino]; and N-methylhomopiperazino. The terms "lower alkyl," "lower alkoxy," and "lower alkylene," as employed herein, include both straight and branched chain radicals of less than eight carbon atoms. The particularly preferred compounds are those wherein W and X are oxy, Z is oxo, A is a lower alkylene radical of two to three carbon atoms (i.e., ethylene, trimethylene-1,3 and propylene-1,2); B represents a di(lower alkyl)amino radical, an N⁴-(lower alkyl)piperazino radical, or an N⁴-(2-heptanoyloxyethyl)piperazino radical, and R and R¹ are hydrogen.

As to salts of the dihydrodibenzoxapines, those coming within the purview of this invention include the acid-addition salts, particularly, the non-toxic acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic, pamoic, fumaric and succinic acid.

The compounds of this invention are therapeutically active compounds which are utilizable both as ataractic agents, and thus may be used in the treatment of depressed psychotic states, as antitussives and as antihistamines. For these purposes they may be administered orally, parenterally or subcutaneously in conventional dosage forms such as tablets, capsules, injectables or the like by incorporating the appropriate dose of the compound with carriers according to accepted pharmaceutical practice.

The compounds of this invention are prepared by a series of reactions as shown by the following equations, wherein Y, X, Z, W, R, R¹, A and B are as hereinbefore defined:

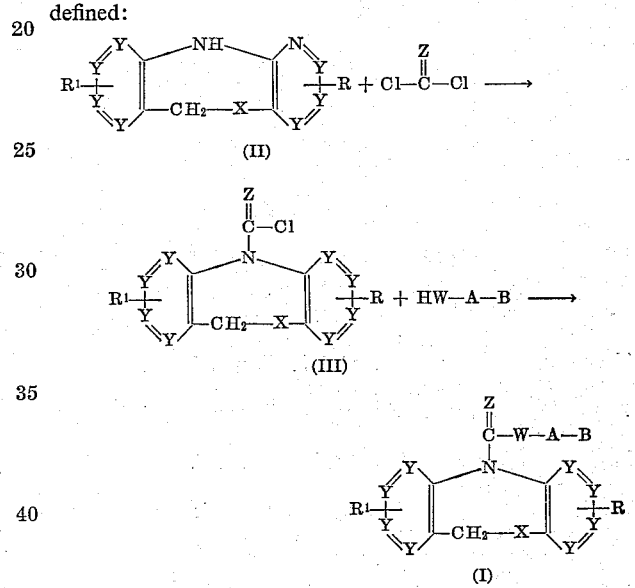

In the first step of the process of this invention, a compound of the Formula II is reacted with phosgene or thiophosgene to yield new intermediates of this invention of the Formula III. This reaction preferably is carried out in an organic solvent in the presense of a base like pyridine, initially in the cold (i.e., a temperature below ambient temperature) and then allowed to warm to room temperature, and stirred at room temperature for ten to twenty hours.

Suitable starting compounds utilizable in the first step of the process of this invention can be prepared as disclosed in our Patent No. 3,069,432 and our application, Serial No. 215,549, filed August 8, 1962. In the case of those compounds wherein all Y's are methylidene and X is thio, the starting materials can be prepared by the process disclosed in said Patent No. 3,069,432, by substituting the desired o-nitrothiophenol for the o-nitrophenol in the process disclosed in the patent.

Among the suitable starting materials may be mentioned:

5,11-dihydrodibenz[b,e][1,4]oxazepine;
Halo-substituted 5,11-dihydrodibenz[b,e][1,4]oxazepines, such as
3-chloro-5,11-dihydrodibenz[b,e][1,4]oxazepine and
3,7dichloro-5,11-dihydrodibenz[b,e][1,4]oxazepine;
Lower alkyl substituted 5,11-dihydrodibenz[b,e][1,4] oxazepines, such as
7-methyl-5,11-dihydrodibenz[b,e][1,4]oxazepine;

Lower alkoxy substituted 5,11-dihydrodibenz[b,e][1,4]
oxazepines, such as
6-methoxy-5,11-dihydrodibenz[b,e][1,4]oxazepine;
Trifluoromethyl substituted 5,11-dihydrodibenz[b,e][1,4]
oxazepines, such as
3-(trifluoromethyl)-5,11-dihydrodibenz[b,e][1,4]
oxazepine;
Trifluoromethyl mercapto substituted 5,11-dihydrodibenz-
[b,e][1,4]oxazepines, such as
3-(trifluoromethylmercapto)-5,11-dihydrodibenz
[b,e][1,4]oxazepine;
Trifluoromethoxy substituted 5,11-dihydrodibenz[b,e]
[1,4]oxazepines, such as
3-(trifluoromethoxy)-5,11-dihydrodibenzo[b,e][1,4]
oxazepine;
N,N-dimethylaminosulfonyl substituted 5,11-dihydrodi-
benzo[b,e][1,4]oxazepines, such as
3-(N,N-dimethylaminosulfonyl) 5,11-dihydrodibenzo
[b,e][1,4]oxazepine;
5,11-dihydrodibenzo[b,e][1,4]thiazepine;
Halo substituted 5,11-dihydrodibenzo[b,e][1,4]
thiazepines, such as
3-bromo-5,11-dihydrodibenzo[b,e][1,4]thiazepine and
3,7-dichloro-5,11-dihydrodibenzo[b,e][1,4]thiazepine;
Lower alkyl substituted 5,11-dihydrodibenzo[b,e][1,4]
thiazepines, such as
7-methyl-5,11-dihydrodibenzo[b,e][1,4]thiazepine;
Lower alkoxy substituted 5,11-dihydrodibenzo[b,e][1,4]
thiazepines, such as
6-methoxy-5,11-dihydrodibenzo[b,e][1,4]thiazepine;
Trifluoromethyl substituted 5,11-dihydrodibenz[b,e][1,4]
thiazepines, such as
3-(trifluoromethyl)-5,11-dihydrodibenz[b,e][1,4]
thiazepine;
Trifluoromethylmercapto substituted 5,11-dihydrodi-
benzo[b,e][1,4]thiazepines, such as
3-(trifluoromethylmercapto)-5,11-dihydrodibenzo
[b,e][1,4]thiazepine;
Trifluoromethoxy substituted 5,11-dihydrodibenzo
[b,e][1,4]thiazepines, such as
3-(trifluoromethoxy)-5,11-dihydrodibenzo[b,e][1,4]
thiazepine;
N,N-dimethylaminosulfonyl substituted 5,11-dihydrodi-
benzo[b,e][1,4]thiazepines, such as
3-(N,N-dimethylaminosulfonyl)-5,11-dihydrodibenzo
[b,e][1,4]thiazepine;
Dihydropyridobenzoxazepines, such as
5,10-dihydropyrido[3,2-b][4,1]benzoxazepine;
Halo substituted dihydropyridobenzoxazepines, such as
9-chloro-6,11-dihydropyrido[3,4-b][4,1]benzoxazepine,
3-chloro-5,10-dihydropyrido[3,2-b][4,1]benzoxazepine,
9-chloro-5,11-dihydropyrido[4,3-c][1,5]benzoxazepine
and
3,7-dichloro-5,10-dihydropyrido[3,2-b][4,1]
benzoxazepine;
Lower alkyl substituted dihydropyridobenzoxazepines,
such as
9-methyl-5,11-dihydropyrido[4,3-c][1,5]benzoxazepine;
Lower alkoxy substituted dihydropyridobenzoxazepines,
such as
9-methoxy-5,11-dihydropyrido[4,3-c][1,5]
benzoxazepine;
Trifluoromethyl substituted dihydropyridobenzoxaze-
pines, such as
9-(trifluoromethyl)-5,11-dihydropyrido[4,3-c][1,5]
benzoxazepine trifluoromethylmercapto substituted
dihydropyridobenzoxazepines, such as
3-chloro-7-(trifluoromethylmercapto)-5,10-dihydro-
pyrido[3,2-b][4,1]benzothiazepine;
Trifluoromethoxy substituted dihydropyridobenzoxaze-
pines, such as
3-chloro-7-(trifluoromethoxy)-5,10-dihydropyrido
[3,2-b][4,1]benzoxazepine;
N,N-dimethylaminosulfonyl substituted dihydropyrido-
benzoxazepines, such as 7-(N,N-dimethylaminosulfonyl)-5,10-dihydropyrido
[3,2-b][4,1]benzoxazepine;
Dihydropyridobenzothiazepines, such as
5,10-dihydropyrido[3,2-b][4,1]benzothiazepine;
Halo substituted dihydropyridobenzothiazepines, such as
3-chloro-5,10-dihydropyrido[3,2-b][4,1]
benzothiazepine;
Lower alkyl substituted dihydropyridobenzothiazepines,
such as
9-methyl-5,11-dihydropyrido[4,3-c][1,5]
benzothiazepine;
Lower alkoxy substituted dihydropyridobenzothiaze-
pines, such as
9-methoxy-5,11-dihydropyrido[4,3-c][1,5]benzo-
thiazepine;
Trifluoromethyl substituted dihydropyridobenzo-
thiazepines, such as
9-(trifluoromethyl)-5,11-dihydropyrido[4,3-c][1,5]
benzothiazepine;
Trifluoromethylmercapto substituted dihydropyrido-
benzothiazepines, such as
3-chloro-7-(trifluoromethylmercapto)-5,10-dihydro-
pyrido[3,2-b][4,1]benzothiazepine;
Trifluoromethoxy substituted dihydropyridobenzo-
thiazepines, such as
3-chloro-7-(trifluoromethoxy)-5,10-dihydropyrido
[3,2-b][4,1]benzothiazepine; and
N,N-dimethylaminosulfonyl substituted dihydropyrido-
benzothiazepines, such as
3-chloro-7-(N,N-dimethylaminosulfonyl)-5,10-dihydro-
pyrido[3,2-b][4,1]benzothiazepine.

In the next step of the process of this invention, the new intermediates of this invention of the Formula III are reacted with a compound of the general formula:

$$HW—A—B$$

wherein W, A and B are as hereinbefore defined. The reaction is preferably conducted in an organic solvent at an elevated temperature, optimally the reflux temperature of the solvent, thereby yielding the final products of this invention. If an acid-addition salt is desired, the final product is then reacted with the desired acid under the usual conditions. If a quaternary ammonium salt is desired the final product is reacted with the desired organic halide or sulfate in the usual manner. Such organic halides and sulfates include the lower alkyl halides (e.g., methyl chloride and ethyl bromide), the lower alkyl sulfates, and the monocyclic ar(lower alkyl) halides and sulfates, such as benzyl chloride.

The following examples illustrate the invention (all temperatures being in centigrade). The first fourteen examples are directed to the preparation of the new intermediates of this invention and the remaining examples are directed to the preparation of the final compounds of this invention:

EXAMPLE 1

*5,11-dihydrodibenz[b,e][1,4]oxazepine-5-carbonyl chloride*

To 19.7 g. of 5,11-dihydrodibenz[b,e][1,4]oxazepine in 150 ml. of dry tetrahydrofuran, cooled to —10°, is added 170 ml. of a 9.3% tetrahydrofuran solution of phosgene, also cooled to —10°, and immediately following 7.1 g. of pyridine. The reaction mixture is stirred overnight at room temperature, filtered, the filtrate washed with water, dried, and concentrated to give about 16.3 g. of 5,11-dihydrodibenz[b,e][1,4]oxazepine-5-carbonyl chloride.

EXAMPLE 2

*5,11-dihydrodibenz[b,e][1,4]oxazepine-5-thiocarbonyl chloride*

By substituting in Example 1, 200 ml. of a 9% solution of thiophosgene in toluene for the toluene solution of phosgene, there is obtained 5,11-dihydrodibenz[b,e][1,4]oxazepine-5-thiocarbonyl chloride.

EXAMPLE 3

*3-chloro-5,11-dihydrodibenz[b,e][1,4]oxazepine-5-carbonyl chloride*

By substituting 23.2 g. of 3-chloro-5,11-dihydrodibenz[b,e][1,4]oxazepine for the 5,11-dihydrodibenz[b,e][1,4]oxazepine in Example 1, there is obtained 3-chloro-5,11-dihydrodibenz[b,e][1,4]oxazepine-5-carbonyl chloride.

EXAMPLE 4

*3-(trifluoromethyl)-5,11-dihydrodibenz[b,e][1,4]oxazepine-5-thiocarbonyl chloride*

By substituting 26.5 g. of 3-(trifluoromethyl)-5,11-dihydrodibenz[b,e][1,4]oxazepine for the 5,11-dihydrodibenz[b,e][1,4]oxazepine in Example 2, there is obtained 3 - (trifluoromethyl) - 5,11 - dihydrodibenz[b,e][1,4]oxazepine-5-thiocarbonyl chloride.

EXAMPLE 5

*7-methyl-5,11-dihydrodibenz[b,e][1,4]oxazepine-5-carbonyl chloride*

By substituting 21.1 g. of 7-methyl-5,11-dihydrodibenz[b,e][1,4]oxazepine for the 5,11-dihydrodibenz[b,e][1,4]oxazepine in Example 1, there is obtained 7-methyl-5,11-dihydrodibenz[b,e][1,4]oxazepine-5-carbonyl chloride.

EXAMPLE 6

*3,7-dichloro-5,11-dihydrodibenz[b,e,][1,4]oxazepine-5-carbonyl chloride*

By substituting 26.6 g. of 3,7-dichloro-5,11-dihydrodibenz[b,e][1,4]oxazepine for the 5,11-dihydrodibenz[b,e][1,4]oxazepine in Example 1, there is obtained 3,7 - dichloro-5,11-dihydrodibenz[b,e,][1,4]oxazepine - 5-carbonyl chloride.

EXAMPLE 7

*5,11-dihydrodibenz[b,e][1,4]thiazepine-5-carbonyl chloride*

By substituting 21.3 g. of 5,11-dihydrodibenzo[b,e][1,4]thiazepine for the 5,11-dihydrodibenz[b,e][1,4]oxazepine in Example 1, there is obtained 5,11-dihydrodibenzo[b,e,][1,4]-thiazepine-5-carbonyl chloride.

Similarly, by substituting an equivalent amount of 3-(N,N - dimethylaminosulfonyl)-5,11-dihydrodibenz[b,e][1,4] - oxazepine, 3-(trifluoromethoxy)-5,11-dihydrodibenz[b,e][1,4]-oxazepine and 3-(trifluoromethylmercapto)-5,11-dihydrodibenz-[b,e,][1,4]oxazepine for the 5,11-dihydrodibenz[b,e,][1,4]-oxazepine in Example 1, there are obtained 3,(N,N-dimethylaminosulfonyl)-5,11-dihydrodibenz[b,e,][1,4]oxazepine - 5 - carbonyl chloride, 3-(trifluoromethoxy) - 5,11 - dihydrodibenz[b,e][1,4]oxazepine-5-carbonyl chloride and 3-(trifluoromethylmercapto) - 5,11-dihydrodibenz[b,e][1,4]oxazepine-5-carbonyl chloride.

EXAMPLE 8

*5,10-dihydropyrido[3,2-b][4,1]benzoxazepine-5-carbonyl chloride*

By substituting 19.7 g. of 5,10-dihydropyrido[3,2-b][4,1]benzoxazepine for the 5,11-dihydrodibenzo[b,e][1,4]oxazepine in Example 1, there is obtained 5,10-dihydropyrido[3,2-b][4,1]benzoxazepine-5-carbonyl chloride.

EXAMPLE 9

*9-chloro-6,11-dihydropyrido[3,4-b][4,1]benzoxazephine-11-carbonyl chloride*

By substituting an equivalent amount of 9-chloro-6,11-dihydropyrido[3,4-b][4,1]benzoxazepine for the 5,11-dihydrodibenzo[b,e][1,4]oxazepine in Example 1, there is obtained 9-chloro-6,11-dihydropyrido[3,4-b][4,1]benzoxazepine-11-carbonyl chloride.

EXAMPLE 10

*9-chloro-5,11-dihydropyrido[4,3-c][1,5]benzoxazepine-11-thiocarbonyl chloride*

By substituting an equivalent amount of 9-chloro-5,11-dihydropyrido[4,3-c][1,5]benzoxazepine for the 5,11-dihydrodibenzo[b,e,][1,4]oxazepine in Example 2, there is obtained 9-chloro-5,11-dihydropyrido[4,3-c][1,5]benzoxazepine-11-thiocarbonyl chloride.

EXAMPLE 11

*9-(trifluoromethyl)-5,11-dihydropyrido[4,3-c][1,5]benzoxazepine-11-carbonyl chloride*

By substituting an equivalent amount of 9-(trifluoromethyl) - 5,11-dihydropyrido[3,2-b][4,1]benzoxazepine for the 5,11-dihydrodibenzo[b,e][1,4]oxazepine in Example 1, there is obtained 9-(trifluoromethyl)-5,11-dihydropyrido[4,3-c][1,5]benzoxazepine-11-carbonyl chloride.

EXAMPLE 12

*3,7-dichloro-5,10-dihydropyrido[3,2-b][4,1]benzoxazepine-5-carbonyl chloride*

By substituting an equivalent amount of 3,7-dichloro-5,10-dihydropyrido[3,2-b][4,1]benzoxazepine for the 5,11 - dihydrodibenzo[b,e][1,4]oxazepine in Example 1, there is obtained 3,7-dichloro-5,10-dihydropyrido[3,2-b][4,1]benzoxazepine-5-carbonyl chloride.

EXAMPLE 13

*9-methyl-5,11-dihydropyrido[4,3-c][1,5]benzoxazepine-11-carbonyl chloride*

By substituting an equivalent amount of 9-methyl-5,11-dihydropyrido[4,3-c][1,5]benzoxazepine for the 5,11-dihydrodibenzo[b,e][1,4]oxazepine in Example 1, there is obtained 9-methyl-5,11-dihydropyrido[4,3-c][1,5]benzoxazepine-11-carbonyl chloride.

EXAMPLE 14

*3-chloro-5,10-dihydropyrido[3,2-b][4,1]benzothiazepine-5-carbonyl chloride*

By substituting 24.9 g. of 3-chloro-5,10-dihydropyrido-[3,2-b][4,1]benzothiazepine for the 5,11-dihydrodibenz[b,e][1,4]oxazepine in Example 1, there is obtained 3-chloro-5,10-dihydropyrido[3,2-b][4,1]benzothiazepine-5-carbonyl chloride.

EXAMPLE 15

*5,11-dihydrodibenz[b,e][1,4]oxazepine-5-carboxylic acid, ester with 2-dimethylaminoethanol*

A mixture of 5.19 g. of 5,11-dihydrodibenz[b,e][1,4]oxazepine-5-carbonyl chloride, 4.5 g. of 2-dimethylaminoethanol and 150 ml. of dry toluene is refluxed for five hours, the supernatant toluene solution is decanted, cooled, extracted with 200 ml. of 10% phosphoric acid, the acid solution is made alkaline with an excess of solid potassium carbonate, and the basic ester extracted into ether. After drying, the ether solution is concentrated to give 4.2 g. of 5,11 - dihydrodibenz[b,e][1,4]oxazepine - 5-carboxylic acid, ester with 2-dimethylaminoethanol, M.P. about 66–68.°

EXAMPLE 16

*5,11-dihydrodibenz[b,e][1,4]oxazepine-5-thiocarboxylic acid, ester with 2-dimethlyaminoethanol*

By substituting in Example 15, 5.51 g. of 5,11-dihydrodibenz[b,e][1,4]oxazepine - 5 - thiocarbonyl chloride for the 5,11-dihydrodibenz[b,e][1,4]oxazepine - 5 - carbonyl chloride, there is obtained 5,11-dihydrodibenz[b,e][1,4]oxazepine-5-thiocarboxylic acid, ester with 2-dimethylaminoethanol.

EXAMPLE 17

*3 - (trifluoromethyl) - 5,11 - dihydrodibenz[b,e][1,4]oxazepine-5-carboxylic acid, ester with 2-(2-piperidinoethoxy)ethanol, salt with one mole of oxalic acid*

(a) A mixture of 9.86 g. of 3-(trifluoromethyl)-5,11-dihydrodibenz[b,e][1,4]oxazepine - 5 - carbonyl chloride, 17.3 g. of 2-(2-piperidinoethoxy)ethanol (prepared from $HOCH_2CH_2OCH_2CH_2Cl$ and piperidine) and 150 ml. of dry toluene is heated under reflux for seven hours. The cooled reaction mixture is then extracted with 200 ml. of 5% hydrochloric acid, the acid extract made alkaline with an excess of solid potassium carbonate, and the liberated base extracted with ether. The dried ether extracts are concentrated and the residue heated at 110–130° (0.5 mm.) to give about 7.2 g. of 3-(trifluoromethyl)-5,11-dihydrodibenz[b,e][1,4]oxazepine - 5 - carboxylic acid, ester with 2-(2-piperidinoethoxy)ethanol.

(b) The product from (a) is dissolved in 100 ml. of anhydrous ether and the solution treated with 1.6 g. of oxalic acid in 10 ml. of warm acetone. The crystalline precipitate is recrystallized from methyl ethyl ketone to give about 3.3 g. of oxalic acid salt.

EXAMPLE 18

*5,10-dihydropyrido[3,2-b][4,1]benzoxazepine-5-carboxylic acid, amide with 2-dimethylaminoethylamine, maleate*

(a) A mixture of 13.1 g. of 5,10-dihydropyrido-[3,2-b][4,1]benzoxazepine-5-carbonyl chloride, 8.8 g. of 2-dimethylaminoethylamine and 150 ml. of dry toluene is heated under reflux for five hours, the toluene solution is separated, washed with water, dried and concentrated to give 5,10-dihydropyrido[3,2][4,1]benzoxazepine-5-carboxylic acid, amide with 2-dimethylaminoethylamine.

(b) The product from (a), 9.4 g., in 25 ml. of dry acetone is treated with a hot acetone solution containing 4 g. of maleic acid. The precipitate which forms is collected by filtration and recrystallized from acetone to give 5,10 - dihydropyrido[3,2-b][4,1]benzoxazepine - 5 - carboxylic acid, amide with 2-dimethylaminoethylamine, maleate.

EXAMPLE 19

*3 - (trifluoromethyl) - 5,11 - dihydrodibenz[b,e][1,4]oxazepine - 5 - thiocarboxylic acid, amide with 2-(2-piperidinoethoxy)ethylamine*

A mixture of 17.3 g. of 3-(trifluoromethyl)-5,11-dihydrodibenz[b,e][1,4]oxazepine-5-thiocarbonyl chloride, 17.1 g. of 2-(2-piperadinoethoxy)ethylamine (prepared from piperidinoethanol and 2-chloroethylamine) and 150 ml. of dry toluene, is reacted as in Example 18, to give 3 - (trifluoromethyl) - 5,11 - dihydrodibenz[b,e][1,4]oxazepine - 5 - thiocarboxylic acid, amide with 2-(2-piperidinoethoxy)ethylamine.

EXAMPLE 20

*3 - chloro - 5,10 - dihydropyrido[3,2-b][4,1]benzothiazepine-5-carboxylic acid, amide with 3-($N^4$-methylpiperazino)propylamine, dihydrochloride*

A mixture of 3.12 g. of 3-chloro-5,10-dihydropyrido-[3,2-b][4,1]benzothiazepine-5-carbonyl chloride, 3.14 g. of 3-($N^4$-methylpiperazino)propylamine (prepared by the reaction of phthalimidopropyl chloride with N-methylpiperazine, followed by hydrolysis) and 25 ml. of dry toluene are heated under reflux for six hours. The toluene solution is decanted, washed with water and dried. The dried and filtered toluene solution is cooled and treated with an anhydrous ether solution containing 1.11 of hydrogen chloride. The precipitated solid is filtered to give 3 - chloro - 5,10 - dihydropyrido[3,2 - b][4,1]benzothiazine-5-carboxylic acid, amide with 3-($N^4$-methylpiperazino)propylamine, dihydrochloride.

EXAMPLE 21

*5,11-dihydrodibenz[b,e][1,4]oxazepine-5-carboxylic acid, amide with 2-dimethylaminoethylamine*

By substituting 14.3 g. of 2-dimethylaminoethylamine for the 2-dimethylaminoethanol in Example 15, there is obtained 5,11-dihydrodibenz[b,e][1,4]oxazepine - 5 - carboxylic acid, amide with 2-dimethylaminoethylamine, M.P. about 135–136°.

EXAMPLE 22

*3-chloro-5,11-dihydrodibenz[b,e][1,4]oxazepine-5-carboxylic acid, ester with 2-dimethylaminoethanol*

By substituting an equivalent amount of 3-chloro-5,11-dihydrodibenz[b,e][1,4]oxazepine - 5 - carbonyl chloride for the 5,11-dihydrodibenz [b,e][1,4]oxazepine - 5 - carbonyl chloride in Example 15, there is obtained 3-chloro-5,11 - dihydrodibenz[b,e][1,4]oxazepine - 5 - carboxylic acid, ester with 2-dimethylaminoethanol.

Similarly, by substituting an equivalent amount of 7-methyl-5,11-dihydrodibenz[b,e][1,4]oxazepine - 5-carbonyl chloride, 3,7-dichloro - 5,11-dihydrodibenz[b,e][1,4]oxazepine - 5-carbonyl chloride, 5,11 - dihydrodibenzo[b,e][1,4]thiazepine - 5 - carbonyl chloride, 3-(N,N-dimethylaminosulfonyl) - 5,11-dihydrodibenz[b,e][1,4]oxazepine-5-carbonyl chloride, 3-(trifluoromethoxy) - 5,11-dihydrodibenz[b,e][1,4]oxazepine-5-carbonyl chloride, 3-(trifluoromethylmercapto) - 5,11-dihydrodibenz[b,e][1,4]oxazepine-5-carbonyl chloride, 9-chloro - 6,11-dihydropyrido[3,4-b][4,1]benzoxazepine-11-carbonyl chloride, 9-chloro - 5,11-dihydropyrido[4,3-c][1,5]benzoxazepine-11-thiocarbonyl chloride, 9-(trifluoromethyl) - 5,11-dihydropyrido[4,3-c][1,5]benzoxazepine-11-carbonyl chloride, 3-7 - dichloro - 5,10-dihydropyrido[3,2-b][4,1]benzoxazepine-5-carbonyl chloride, and 9-methyl - 5,11-dihydropyrido[4,3-c][1,5]benzoxazepine-11-carbonyl chloride for the 5,11-dihydrodibenz[b,e][1,4]oxazepine - 5-carbonyl chloride in Example 15, there is obtained the respective carboxylic or thiocarboxylic acid esters with 2-dimethylaminoethanol.

Moreover, if one of these compounds is substituted for the 5,10-dihydropyrido[3,2-b][4,1]benzoxazepine-5-carbonyl chloride in Example 18, the corresponding amides with 2-dimethylaminoethylamine are obtained.

EXAMPLE 23

*3 - (trifluoromethyl)5,11-dihydrodibenz[b,e][1,4]oxazepine-5-carboxylic acid, ester with 2-(2-piperidinoethoxy)ethanol, methobromide*

To 4.64 g. of the product from Example 17(a) in 25 ml. of anhydrous acetone is added an anhydrous acetone solution containing 4.8 g. of methyl bromide. The mixture is shaken thoroughly and kept for forty-eight hours at room temperature. The mixture is concentrated to give 3-(trifluoromethyl)-5,11-dihydrodibenz[b,e][1,4]oxazepine-5-carboxylic acid, ester with 2-(2-piperidinoethoxy)ethanol, methobromide.

This invention may be variously otherwise embodied within the scope of the appended claims.

What is claimed is:

1. A compound selected from the group consisting of bases of the formula

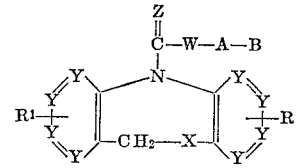

and non-toxic salts thereof wherein one Y is selected from the group consisting of aza and methylidene and the remaining Y's are methylidene; X is selected from the group consisting of oxy and thio, Z is oxo, W is imino, A is lower alkylene of at least two carbon atoms, B is a basic saturated nitrogen-containing radical of less than twelve carbon atoms, and R and R' are each selected from the group consisting of hydrogen, halogen, lower alkyl, lower alkoxy, trifluoromethyl, trifluoromethylmercapto, trifluoromethoxy and N,N-dimethylaminosulfonyl.

2. A 5,11-dihydrodibenz[b,e][1,4]oxazepine - 5 - carboxylic acid having the formula

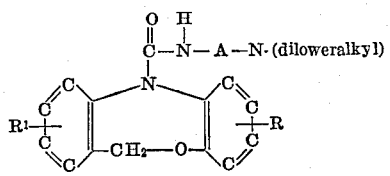

wherein A, R and $R^1$ are as defined in claim 1.

3. A 5,11-dihydrodibenz[b,e][1,4]oxazepine - 5 - carboxylic acid having the formula

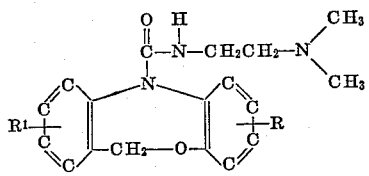

wherein R and $R^1$ are as defined in claim 1.

4. A 5,10-dihydropyrido[3,2-b][4,1]benzoxazepine-5-carboxylic acid having the formula

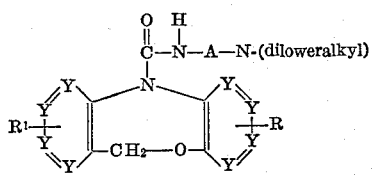

wherein A, R and $R^1$ are as defined in claim 1 and one Y is aza and the remaining Y's are methylidene.

5. A 5,10 - dihydropyrido[3,2 - b][4,1]benzoxazepine-5-carboxylic acid having the formula

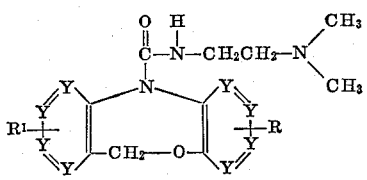

wherein R and $R^1$ are as defined in claim 1 and one Y is aza and the remaining Y's are methylidene.

References Cited by the Examiner

UNITED STATES PATENTS

| | | | |
|---|---|---|---|
| 2,650,919 | 9/1953 | Cusic | 260—243 |
| 2,687,414 | 8/1954 | Cusic | 260—243 |
| 2,776,971 | 1/1957 | Cusic | 260—243 |
| 2,934,533 | 4/1960 | Schuler et al. | 260—243 |
| 2,974,139 | 3/1961 | Schuler et al. | 260—243 |
| 2,989,529 | 4/1960 | Schuler et al. | 260—243 |
| 3,079,393 | 2/1963 | Yale et al. | 260—268 |

FOREIGN PATENTS

| | | |
|---|---|---|
| 214,613 | 1/1957 | Australia. |
| 217,538 | 9/1958 | Australia. |

OTHER REFERENCES

Lowy et al.: Introduction to Organic Chemistry, Wiley, 6 ed. (1945), pages 213–15, QD 253–L88.

WALTER A. MODANCE, *Primary Examiner.*

NICHOLAS RIZZO, *Examiner.*

ROBERT T. BOND, ALAN L. ROTMAN,
*Assistant Examiners.*

UNITED STATES PATENT OFFICE
CERTIFICATE OF CORRECTION

Patent No. 3,259,631　　　　　　　　　　　　　　　　July 5, 1966

Harry Louis Yale et al.

It is hereby certified that error appears in the above numbered patent requiring correction and that the said Letters Patent should read as corrected below.

Column 2, lines 20 to 25, for that portion of formula (II) reading

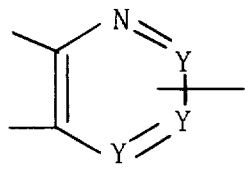　　　read　　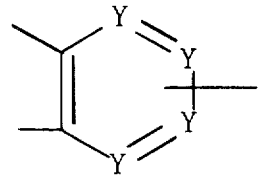

column 7, line 34, for "[3,2]" read -- [3,2-b] --; line 74, for "thiazine-" read -- thiazepine- --.

Signed and sealed this 1st day of August 1967.

(SEAL)
Attest:

EDWARD M. FLETCHER, JR.　　　　　　　　　　EDWARD J. BRENNER
Attesting Officer　　　　　　　　　　　　　Commissioner of Patents